May 1, 1956  E. J. URBAS  2,743,461
INSERT NUT AND FLANGE
Filed July 3, 1952  2 Sheets-Sheet 1

INVENTOR.
Ernest J. Urbas
BY Robb & Robb
Attorneys

May 1, 1956 E. J. URBAS 2,743,461
INSERT NUT AND FLANGE
Filed July 3, 1952 2 Sheets-Sheet 2
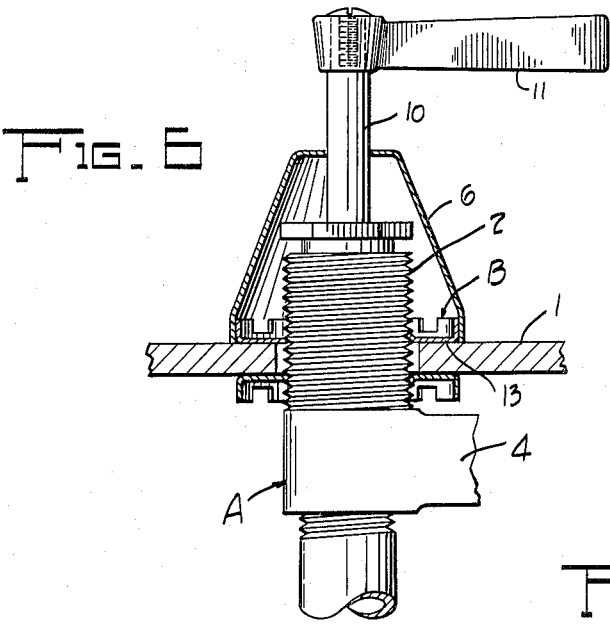
Fig. 6
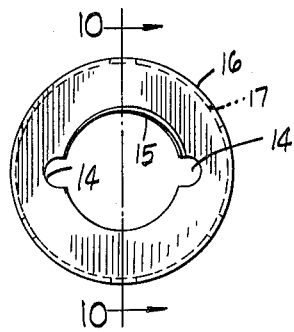
Fig. 8
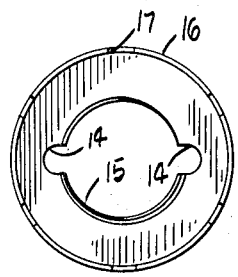
Fig. 7
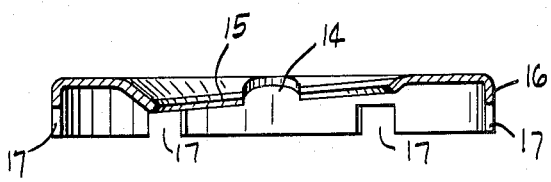
Fig. 10
Fig. 9
INVENTOR.
Ernest J. Urbas
BY Robb & Robb
Attorneys _United States Patent Office_

2,743,461
Patented May 1, 1956

2,743,461
INSERT NUT AND FLANGE

Ernest J. Urbas, Cleveland, Ohio, assignor to The Guarantee Specialty Manufacturing Company, Cleveland, Ohio Application July 3, 1952, Serial No. 297,120

1 Claim. (Cl. 4—191)

The purpose of this invention has been to provide a simplified form of ring nut suitable particularly for attaching valve fixtures used in lavatory installations, or the like.

An additional object in the working out of this invention, has been to design the ring nut hereof for special combination action as a screw insert member for friction joinder with the usual type of flange or escutcheon employed in conjunction with the above type of fixtures, whereby to hold the flange or escutcheon in place on the fixture.

A further object of this invention has been to form the so-called ring nut of relatively light sheet metal enabling it to be stamped out readily, formed with a thread element to afford its screw function, and likewise formed with a friction flange for engagement with the inside of the escutcheon to be seated and held in place by said nut.

A simple embodiment of the invention, as when in use, is illustrated in the accompanying drawings and in said drawings.

Figures 6, 7, 8, 9 and 10 respectively, are views of the same nature as Figures 1 to 5 respectively, but showing a modified construction and mode of use of a nut embodying the invention, and Figure 10 being considerably enlarged with the section taken about on the line 10—10 of Figure 8.

Referring to the annexed drawings intended to illustrate in a general manner a conventional type of valve fixture such as used for lavatories, sinks or the like, the ledge of the lavatory or sink is designated 1 and is provided with the usual opening through which the valve fixture passes at the upper threaded portion 2 thereof. Connected with the lower part of the valve fixture is the usual water supply pipe 3 and water entering the valve portion of the fixture is adapted to pass through the usual outflow pipe 4, leading therefrom to a suitable spout.

Figure 1:
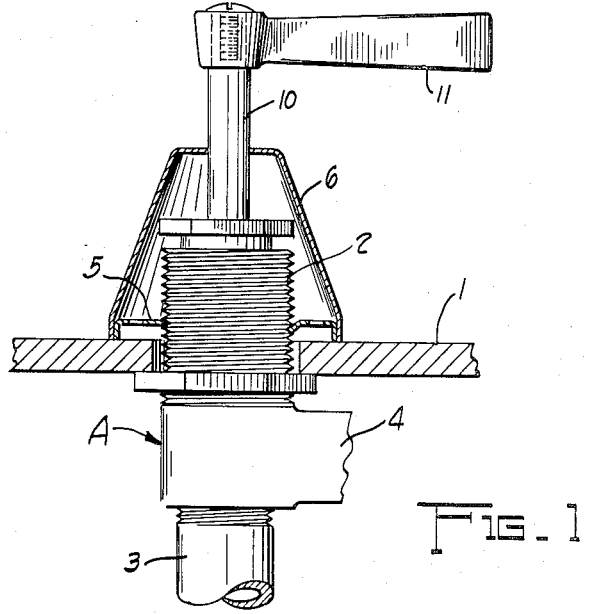
Figure 1 is a vertical sectional view of the ledge of a lavatory or sink having a valve fixture mounted thereon by means of the improved nut construction of the invention, the flange or escutcheon coacting with the said nut and held in place thereby being also shown.
Figure 2:
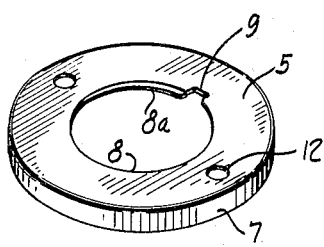
Figure 2 is a perspective view of the improved nut of the invention looking toward the same from the upper side thereof.
Figure 3:
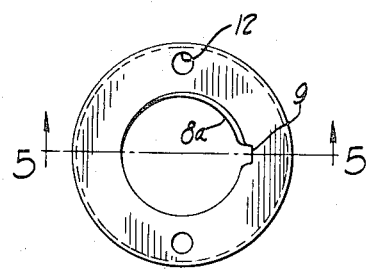
Figure 3 is a top plan view of the nut.
Figure 4:
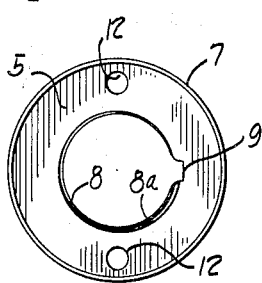
Figure 4 is a bottom plan view of the nut, bringing out a little more clearly the formation of the thread element thereof.
Figure 5:
Figure 5 is a vertical sectional view of the nut alone, looking in the direction of the arrows and taken on the line 5—5 as seen in Figure 3.

As seen particularly in Figure 1 of the drawings, the valve fixture which may be generally designated as A, is held in place on the ledge 1 by means of a ring nut 5 which is an essential feature of the present invention in conjunction with the flange or escutcheon 6 which enters into cooperative relation with said ring nut in the assembly of the parts of the invention.

The ring nut 5 is of peculiar formation. As seen from the figures of the drawings, it is made from a stamping of flat sheet metal formed to provide the relatively flat body of the nut and having at the peripheral edge of the body the downwardly extending flange 7. The flange 7 is a continuous round flange coextensive with the peripheral edge of the body of the nut 5.

At the central portion of the nut body, the latter is stamped out to provide an opening generally designated 8, from which opening there extends a notch 9 forming an interruption in the continuity of the periphery of the opening.

In order to give the necesary nut function to the nut 5, it is contemplated to form a thread section at the peripheral portion of the opening 8 centrally of the nut body. With this in mind, the material of the body of the nut at the periphery of the opening 8 and commencing at one side of the notch 9, is bent downwardly to provide a shallow thread section or flange tapering gradually in depth from the point where it starts at one side of said notch 9 to the point where it substantially ends at the other side of the notch. The construction of this thread section on the body of the nut 5 is seen best perhaps in Figures 4 and 5 of the drawings, the thread section being designated 8a and having a deflection which is spirally very shallow in its nature.

The downwardly extending flange at the outer periphery of the nut 5 is of an intentional diameter to enable said flange to snugly fit and frictionally bind within the lower end portion of the flange or escutcheon 6 previously referred to and shown in Figure 1. By its engagement with the escutcheon 6, the flange portion of the nut 5, said portion designated 7, is adapted to relatively tightly bind within the bottom portion of the skirt of the escutcheon 6 and thus to hold said escutcheon firmly in place on the valve fixture after the latter has been mounted upon the ledge of the lavatory, sink or other member designated 1.

The method of assembling the parts of the invention is comparatively simple and involves merely the passing through the ledge 1 of the threaded portion 2 of the fixture, when the handle of the fixture has been detached. Once in position as shown in Figure 1 of the drawings, the fixture will have applied to the threaded portion 2 the ring nut 5 hereinbefore described and the latter will be screwed down tightly against the top of the ledge 1, thus firmly holding the fixture in place on the latter. Thereafter, the escutcheon 6 will be mounted in place by being slipped downwardly over the stem 10 of the fixture, and the lower end of the escutcheon is forced firmly downwardly over the flange 7 of the nut 5. The frictional binding between the part 7 of the nut 5 and the escutcheon 6 is quite sufficient to firmly hold the latter in place in its mounted relation to the fixture parts as attached to the ledge 1. The escutcheon 6 once placed in position, the handle 11 of the valve may be applied to the stem 10 in the customary way.

From the foregoing description, it will be obvious that the ring nut 5 and the escutcheon 6 may be supplied as a combined unit, the nut 5 assembled as a friction insert screw member normally within the escutcheon 6 and readily detachable therefrom for purposes of application to a valve fixture to which the particular size of the ring nut and escutcheon is applicable.

Suitable small apertures 12 are formed in the body of the nut 5 at points on diametrically opposite sides of the opening 8, for receiving members of a turning wrench that may be used to screw the nut on the threaded portion 2 of the fixture. The nut 5 virtually forms a screw insert for and when assembled on the member 6 which latter is also a sheet metal die formed part.

Reference is now made to Figures 6 to 10 inclusive of the drawings, disclosing a somewhat specifically different construction of the ring nut unit, the same embodying the same principles of formation, generally speaking, as the nut disclosed in Figures 1 to 5 inclusive.

In Figure 6, the portions of the fixture or valve unit which correspond with those in Figure 1, are designated in the same manner as by like reference numerals.

Figure 7 shows in perspective view the modified form of nut and discloses that at diametrically opposite portions of the opening in the nut body designated 13, there are formed notches 14 in the blank from which the article is made. The notches 14 are relatively shallow and the thread section 15 which corresponds with the thread section 8a previously described as to the first form of this invention, starts at one side of one of the notches 14 and terminates at the opposite side of said notch. Said thread section 15 is interrupted partially about midway of its ends by the other of the notches 14. The notch portions 14 when the nut 13 is used as shown at B in Figure 6, permit of passage downwardly of any slight accumulations of water above the nut 13, shown uppermost in Figure 6. In its disposition as illustrated at B in Figure 6, the nut 13 is inverted as compared with its method of assembly, or rather the method of assembly of the nut 5 with the escutcheon 6 as illustrated in Figure 1. Thus, the flat portion of the nut 13 as shown in B, lies flat down upon the ledge 1, of the lavatory.

The nut 13 as now being described, has the flange portion 16 thereof provided with a series of shallow notches 17, in which may be seated the working end of a screwdriver or similar tool, to which blows may be applied in order to tightly affect the screwing movement of the nut 13 upon the threaded portion 2 of the fixture A. In other words, the notches 17 afford a facility for final tightening the screwing movement of the notch on the part 2, taking the place of the openings 12 that are employed in the form of the invention first described as regards the nut 5.

In Figure 6 of the drawings, it will be seen that a lowermost nut 13 of the type of construction of the modified form of this invention, is utilized, the same being screwed upon the threaded portion 2 of the fixture A, beneath the ledge 1, and enabling the said portion 2 to be held in place between the upper and lower nuts 13 disposed with clamping action against the opposite upper and lower sides respectively of the ledge 1.

It is to be understood, therefore, that nuts such as 13 just above described, and the nut 5 previously first described may be applied to the threaded portions of the fixture A with the flange portion of the nut uppermost or extending downwardly as may be found preferable.

Figure 10 of the drawings is a considerably enlarged view which brings out the formation of the thread section 8a, as to the construction first described, and the thread section 15 as to the second described form of the nut. For proper shaping of the thread section 8a, or 15, as the case may be, the said section is coined after the known manner of formation familiar to those versed in the art of die stamping.

Having thus described my invention, what I claim as new and desire to secure by Letters Patent of the United States, is:

In combination, a valve fixture comprising a threaded upper portion to pass through the ledge of a sink or the like, for connection with a supply pipe, a valve stem in said threaded portion and projecting upwardly therefrom, a handle on said stem, and an escutcheon surrounding said threaded portion for housing same and adapted to engage at its lower end with said ledge, the upper end of the escutcheon having an opening through which the valve stem extends upwardly to receive its handle, and a ring nut formed into a flat body having an opening to receive said threaded upper portion of the fixture and formed with a thread section at the periphery of the opening interengaging the fixture threaded portion to screw downwardly therein against the sink ledge, said ring nut being also formed with a peripheral flange extending at right angles from the plane of the flat body and fitting into the lower end of the escutcheon and said flange having a smooth outer surface frictionally binding against the inner wall of the latter to hold the escutcheon in place in engagement with said ledge.

References Cited in the file of this patent

UNITED STATES PATENTS

| | | |
|---|---|---|
| 638,611 | Totham | Dec. 5, 1899 |
| 1,261,232 | Hibbard | Apr. 2, 1918 |
| 1,406,030 | Kelly | Feb. 7, 1922 |
| 1,424,250 | Kelly | Aug. 1, 1922 |
| 2,064,091 | Tinnerman | Dec. 15, 1936 |
| 2,096,602 | Weingarten | Oct. 19, 1937 |
| 2,284,081 | Beggs | May 26, 1942 |
| 2,397,251 | Eggert | Mar. 26, 1946 |

FOREIGN PATENTS

| | | |
|---|---|---|
| 635,044 | France | Mar. 3, 1928 |